3,129,240
PREPARATION OF NITRILES
Lenze Hartstra, Amsterdam, Netherlands, assignor to Shell Oil Company, New York, N.Y., a corporation of Delaware
No Drawing. Filed Mar. 30, 1962, Ser. No. 183,722
Claims priority, application Netherlands Apr. 26, 1961
6 Claims. (Cl. 260—465)

The invention relates to a process for the preparation of halogenated compounds of an aromatic character by halogenation of the corresponding compounds containing one or more nitro groups. The invention in particular relates to the preparation of halogenated nitriles substituted by halogen in at least one ortho position relative to the cyano group, from the corresponding nitriles containing nitro groups.

In such a process it is possible to replace one or more nitro groups of the compound concerned by chlorine or bromine atoms upon heating the base material with the free halogen or with a thionyl halogenide. It has been found, however, that the yields in these reactions are in general subject to great fluctuations and are also in most cases, extremely low, so that practical application of processes based thereon has so far not been attractive.

Applicant has now found that these drawbacks stem from the presence of varying amounts of iron or iron compounds and/or alloys thereof in the reaction medium and that they are completely obviated when care is taken to keep the amount of such materials below a certain limit, which is at most 6 milliequivalents per mole of the original nitro compound.

The invention therefore relates to an improved process for the preparation of halogenated compounds of an aromatic nature, characterized in that a compound of an aromatic nature, substituted in the nucleus by one or more nitro groups, is contacted with a halogenating agent, in the absence of iron and iron-containing compounds and/or alloys, or in the presence of not more than 6 milliequivalents of such materials per mole of the nitro compound used as base material.

The nitro compound used as initial material can be derived from benzene, naphthalene, phenanthrene or other aromatic systems. These systems include also heterocyclic compounds of an aromatic character, such as nitro derivatives of pyridine, quinoline, furan, thiophene, benzothiazole and others. In general, however, derivatives of benzene are preferred. The nitro compounds may contain one or more nitro groups per molecule and in addition other substituents may be bound to the aromatic nucleus, for example halogen atoms, such as chlorine and/or bromine, cyano groups, alkoxy or carbalkoxy groups, and/or hydrocarbon radicals, for example, alkyl groups.

A base material is preferred which contains, besides the nitro group(s), one or more cyano groups, preferably in an otho position, as nucleus substituents. Examples are: 2 - nitrobenzonitrile, 1,3-dinitro-2-cyanonaphthalene, 3-chloro-1-nitro-2-cyanonaphthalene, 5 - (or 6-) methyl-2-chlorobenzonitrile, and 6-chloro-2-methoxybenzonitrile. The process according to the invention is particularly suitable for the preparation of 2,6-dichlorobenzonitrile, starting from 6-chloro (or 6-bromo)-2-nitrobenzonitrile or from 2,6-dinitrobenzonitrile.

The above-mentioned compounds in which, next to one or more nitro groups, at least one cyano group is present as nucleus substituent, can be obtained very advantageously by conversion of the corresponding nitro compound containing one or more halogen atoms, in particular from an ortho-chloro(or ortho-bromo)-nitrobenzene which may or may not contain other nucleus substituents by reaction with one or more metal cyanides. The metal cyanide preferably used for this purpose is cuprocyanide, either alone or together with sodium and/or potassium cyanide. Excellent results are obtained when the reaction is carried out in a medium containing an N,N-dialkyl acid amide or a dialkyl sulphoxide. Dimethyl formamide is preferably used. After completion of the reaction the dimethyl formamide is removed by elution with water, whereupon the reaction mixture is heated with a solvent which forms an azeotrope with water and in which the nitrile is soluble. In this procedure the water is distilled off azeotropically and the nitrile can be separated from the solution obtained after removal of any metal salts which may be present. The preferred solvent is 1,2-dichloroethane. The above process has proved to be particularly suitable for the preparation of base materials such as 6-chloro (or 6-bromo)-2-nitrobenzonitrile and 2,6-dinitrobenzonitrile.

The halogenating agent with which the nitro compound is brought into contact according to the process claimed can be either free halogen or one of the usual halogenating agents employed for aromatic nucleus substitutions. Excellent results are obtained with the halogens chlorine and/or bromine, and with the corresponding thionyl halogenides, in particular with chlorine. The reaction, in which one or more nitro groups are replaced by halogen atoms, is in general performed at temperatures from 170° C. up to 300° C., and in particular at temperatures between 180 and 210° C.

In general the halogenating agent is in the gaseous state when brought into contact with the nitro compound, the latter then being preferably in the liquid state. If desired, a diluent may be used as well. For practical purposes it is desirable to perform the reaction continuously, either in co-current or in countercurrent. In the latter case one may, for instance, contact a stream of chlorine flowing upwards through a vertical column with a downflowing stream of nitro compound. Such a column should preferably be a filled one, for instance one with Raschig rings, in order to ensure intimate contact between the reacting components.

As a rule the nitro compound is brought into contact with at least the amount of halogenating agent theoretically required for the replacement of the relevant nitro groups. In many cases, however, it will be profitable to employ a substantial excess of halogenating agent, such as at least from two to six times the equivalent amount. If required, an inert gas such as nitrogen can be used as diluent.

The nitro compound is also made to react either undiluted or dilute. In the former case the compound is fed into the reaction vessel as a gas or liquid, and if necessary in the molten state. The reaction product is then frequently obtained as distillate or sublimate. To facilitate the isolation of the reaction product, it is recommended to extract the reaction mixture with the aid of a solvent, for instance, in a column provided with a reflux condenser, in which the solvent is kept boiling. This column is preferably connected direct with the reaction vessel by means of a heated or non-heated line. By this arrangement the reaction product is obtained in the extraction vessel as bottom product in solution, while any excess of halogenating agent can be made to react anew. Suitable solvents include: benzene, carbon tetrachloride, 1,2-dichloroethane and o-dichlorobenzene. In many cases, however, it is far more profitable to have the nitro compound in solution when starting the reaction with the halogenating agent. When a solvent is used that is, at least substantially, present in the liquid state under the reaction condtions, the reaction product may be obtained in solution as bottom product in the reaction vessel. If, in addition, sublimation of the product takes place during the reaction, the solvent should preferably be chosen such that the reaction mixture is boiling at the reaction temperature, the partial pressure of the solvent being sufficiently high to reduce the partial pressure of the sublimating material to such an extent that deposits of the latter in the equipment are avoided. In other cases the solvent may, together with the reaction product, be distilled over to the extraction column. From the solution obtained by one of the above procedures the product is then separated in a pure form, after removal of impurities, if required.

The halogenation reaction is preferably carried out in a continuously stirred reactor, care being taken that the composition of the reactor contents remains constant and is equal to that of the discharged product. Vigorous stirring is essential to establish intimate contact between the liquid and the gaseous halogenating agent. In this way it can easily be ensured that the halogenating agent in the liquid phase is present in very high concentration, while the concentration of the base material remains low.

The procedure described is in particular suitable for the preparation of 2,6-dichlorobenzonitrile, when starting from 6-chloro-2-nitrobenzonitrile. The reaction can be performed, for instance, in the presence of a high-boiling solvent, such as o-dichlorobenzene or a more highly chlorinated benzene. The reaction product is thereby obtained as a solution. The 2,6-dichlorobenzonitrile in the solution is finally precipitated by the addition of gasoline, filtered and washed with methanol to remove impurities.

When proceeding according to the process claimed, one should take care to perform the reaction between the nitro compound and the halogenating agent in an iron-free medium, or in a medium containing at most 6 milliequivalents of iron per mole of the nitro compound, either as metal or in the form of compounds and/or alloys such as salts, complex compounds and/or steel grades. The iron content should preferably be not more than 4 milliequivalents and in particular be at most 0.4 millequivalent per mole of the nitro compound.

As the base materials used are mostly contaminated with iron in some form or other which derives from reagents employed in the preparation, such as cuprocyanide, solvents, and the like, or from the equipment, storage vessel, etc., or by attack on the apparatus used in the halogenation reaction, considerable amounts of iron invariably find their way into the reaction medium, so that the above requirement is not generally satisfied. In consequence, competing side reactions then occur which interfere susbtantially with the desired reaction. By taking special precautions, one can restrict the amount of iron present in the reaction, and of any compounds and/or alloys thereof, to at most the maximum allowable.

In this connection it is of particular interest to subject the nitro compound used as base material to a preliminary treatment with a view to eliminating any traces of iron and its compounds present therein as far as is practicable. Applicant has found that extraction by means of acids gives excellent results. Preferably hydrochloric acid is used, for instance a 10% aqueous solution. Other suitable acids include acetic acid, citric acid, and the like. If necessary, the acid treatment is repeated a few times. To remove traces of acid, the product is subsequently washed with water until neutral. If desired, the acid can first be neutralized with caustic soda, ammonia, sodium bicarbonate, and the like, and the product subsequently washed with water. In other cases it is advantageous to remove any iron with the aid of complexones or ion exchangers. The nitro compound is preferably taken into solution beforehand. Examples of suitable solvents are o-dichlorobenzene or benzene. The preliminary treatment of the nitro compound can obviously be dispensed with, if this compound has been prepared under conditions at which no contamination with iron has been possible and if the stored product is kept in iron-free containers. Traces of iron and its compounds and/or alloys can only be tolerated if the above-mentioned limit is not exceeded.

Also, it is desirable to avoid the use of iron-containing apparatus and connections for the halogenation reaction. By preference an enamelled reaction vessel is used, and the feed lines may likewise be enamelled or made of glass. The other accessories, such as a reflux condenser, Raschig rings, stirrers, if any, etc. are preferably also enamelled or made of porcelain or glass. For that matter, also other iron-free materials such as "Teflon," tantalum, etc. are equally suitable. The halogenating agent, which is generally stored in iron cylinders, should be rid of any traces of entrained iron or its compounds. This can be done advantageously and simply by means of an interposed filter, for instance one made of glass wool.

Although the halogenation reaction is not influenced by copper compounds, it is often desirable to exclude such compounds as well, because they may contaminate the final product and give rise to plugging. Therefore, the above-described preliminary treatments of the nitro compound are also recommended when the base material contains traces of copper compounds. This applies especially when the nitro compound contains cyano groups which have been introduced into the molecule by substitution of halogen atoms with the aid of cuprocyanide. An example is the preparation of 6-chloro-2-nitrobenzonitrile from 2,3-dichloronitrobenzene by means of cuprocyanide.

The compounds that can be produced by means of the process claimed find application, for instance, as solvents, biocides, and intermediate products in numerous chemical syntheses. Of great interest, because of their herbicidal properties, are the halogenated compounds of an aromatic character that contain cyano groups, such as 2,6-dichlorobenzonitrile.

*Example 1.—Preparation of 2,6-Dichlorobenzonitrile in the Presence of Iron*

(a) *6-chloro-2-nitrobenzonitrile.*—The starting material was a product which had been prepared by reacting 2,3-dichloronitrobenzene with cuprocyanide in dimethyl formamide. After removing the dimethyl formamide by elution with water, the remaining mixture was heated with 1,2-dichloroethane, any water left behind being distilled off azeotropically. The codistilled solvent was thereupon separated from the water and refed to the reaction vessel. Finally, the product was passed through filters, the solvent being distilled from the solution obtained.

The base material 2,3-dichloronitrobenzene had been stored in an iron drum prior to use. Furthermore, the equipment used for the above-described procedure was partly made of stainless steel. The product so obtained contained 1797 p.p.m. Fe, which corresponds with 17.6 milliequivalents Fe per mole of 6-chloro-2-nitrobenzonitrile (1 gram-atom Fe=3 gram-equivalents).

(b) *Chlorination.*—Into a non-corrosive, continuously stirred reaction vessel provided with a reflux condenser a total of 185 parts by weight of the above product was continuously introduced in the molten state over a period of 15 hours. At the same time a stream of chlorine was passed through the liquid at a reaction temperature of approx. 210° C. and with vigorous stirring. The total quantity of chlorine introduced amounted to 230 parts by weight. The excess chlorine and the gaseous reaction products were discharged through the reflux condenser. During the reaction sufficient amounts of reaction product were continuously withdrawn from the reactor for the level inside the latter to remain constant. The product discharged from the reactor, which showed pronounced sublimation, was at once taken up in 1,2-dichloroethane of 140° C., the solution filtered and the 2,6-dichlorobenzonitrile in the filtrate prceipitated by the addition of gasoline (boiling range 60–80° C.). After filtering and drying, the yield of the 2,6-dichlorobenzonitrile so obtained was 15.2 parts by weight, which corresponds with 8.7% of the theoretical amount of pure product.

*Example II.—Preparation of 2,6-Dichlorobenzonitrile in the Absence of Iron*

(a) *Preliminary treatment of 6-chloro-2-nitrobenzonitrile.*—Part of the product obtained according to Example I (a) was extracted twice with a 10% w. aqueous HCl solution and then washed four times with water. The neutral product so obtained contained only 6 p.p.m. Fe, which corresponds with 0.06 milliequivalent Fe per mole of 6-chloro-2-nitrobenzonitrile.

(b) *Chrorination.*—The product pretreated according to (a) was chlorinated in the manner described in Example I; (b), except for the following modifications:

To prevent sublimation of the reaction product, the chlorination was performed in the presence of o-dichlorobenzene. A solution of 185 parts by weight of 6-chloro-2-nitrobenzonitrile in 37 parts by weight of o-dichlorobenzene was continuously chlorinated at approx. 190° C., a total of 160 parts by weight of chlorine being fed into the reaction vessel. From the solution continuously withdrawn from the reactor the resultant 2,6-dichlorobenzonitrile was precipitated with the aid of gasoline, filtered and dried. The yield amounted to 145 parts by weight, which corresponds with 83% of the theoretical amount of pure product, and the product obtained contained 95% of 2,6-dichlorobenzonitrile.

As appears from Examples I and II, the preliminary treatment of the starting material results in a considerable reduction of the iron content. Chlorination of the material so pretreated (Example I) produces the corresponding chloro compound in a very pure state and in high yields.

*Example III.—Preparation of 2,6-Dichlorobenzonitrile From 6-Chloro-2-Nitrobenzonitrile in the Presence of Iron*

In order to demonstrate the influence of intentionally added iron on the chlorination reaction, the latter was carried out using pure 6-chloro-2-nitrobenzonitrile to which known amounts of powdered iron had been added.

The starting material was the product prepared according to Example I(a), which could be obtained iron-free by repeated recrystallization from benzene. This method of purification is, however, too cumbersome to be applied on an industrial scale, for one thing in view of the losses involved. The chlorination was performed in the manner described in Example II(b).

(a) The starting material was a product containing 3 g. Fe on 72.8 g. 6-chloro-2-nitrobenzonitrile, which corresponds with a content of 400 milliequivalents Fe per mole of 6-chloro-2-nitrobenzonitrile. Chlorination produced only a dark tarry mass from which no pure product could be isolated.

(b) The starting material contained 0.05 g. Fe on 50 g. 6-chloro-2-nitrobenzonitrile, which corresponds with a content of 9.8 milliequivalents Fe per mole of 6-chloro-2-nitrobenzonitrile. The purity of the chlorinated product (2,6-dichlorobenzonitrile) was only 63%. The yield of pure product amounted to approx. 60%.

(c) In this experiment only 0.005 g. Fe had been added to 51 g. 6-chloro-2-nitrobenzonitrile. The product thus had a content of 0.96 milliequivalent Fe per mole of 6-chloro-2-nitrobenzonitrile. Upon chlorination the 2,6-dichlorobenzonitrile was obtained in a yield of 75% basis pure product, while the purity of the product was 95%.

(d) Finally, a chlorination experiment was carried out on a sample of recrystallized 6-chloro-2-nitrobenzonitrile to which no iron had been added. Conversion into 2,6-dichlorobenzonitrile was practically quantitative, the purity of the final product being also very nearly 100%.

Example III clearly shows the retardant effect of iron on yield and contaminant effect of iron on purity of the final product.

I claim as my invention:

1. A process for the preparation of 2,6-dichlorobenzonitrile which comprises mixing, at a temperature of from about 170° C. to about 300° C., 6-chloro-2-nitrobenzonitrile and chlorine, the mixture being maintained substantially free from iron and iron-containing compounds.

2. A process according to claim 1 wherein the concentration of any iron and iron compounds in the mixture does not exceed six milliequivalents of iron per mole of the 6-chloro-2-nitrobenzonitrile.

3. A process according to claim 1 wherein at least three moles of chlorine are used for each mole of 6-chloro-2-nitrobenzonitrile used.

4. A process according to claim 3 wherein o-dichlorobenzene is employed as reaction solvent.

5. A process for the preparation of 2,6-dichlorobenzonitrile which comprises mixing, at a temperature of from about 170° C. to about 300° C., 6-chloro-2-nitrobenzonitrile and thionyl chloride, the mixture being maintained substantially free from iron and iron-containing compounds.

6. A process for the preparation of 2,6-dichlorobenzonitrile which comprises mixing, at a temperature of from about 170° C. to about 300° C., 2,6-di-nitrobenzonitrile and chlorine, the mixture being maintained substantially free from iron and iron-containing compounds.

References Cited in the file of this patent

Finger et al.: J. of Amer. Chem. Soc., vol. 78, pages 6034–6037, Dec. 5, 1956.

Vorozhtsov, Jr. et al.: Chem. Abstracts, vol. 55, pp. 24605–24606, Nov. 27, 1961.